Jan. 9, 1968 W. J. HAYWARD 3,362,259
VEHICLE POWER PLANT

Filed March 12, 1965 4 Sheets-Sheet 1

Inventor
WILLIAM J. HAYWARD
BY
Tweedale & Gerhardt
Attorneys

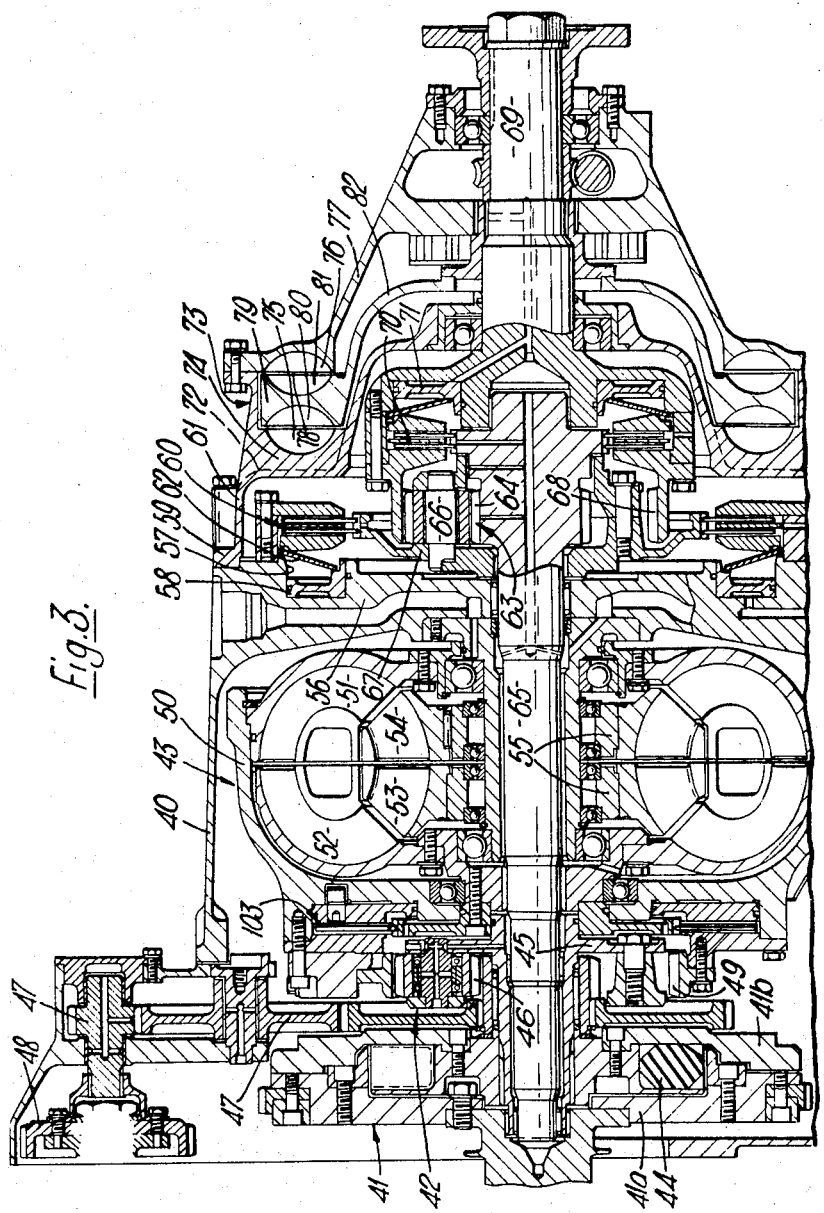

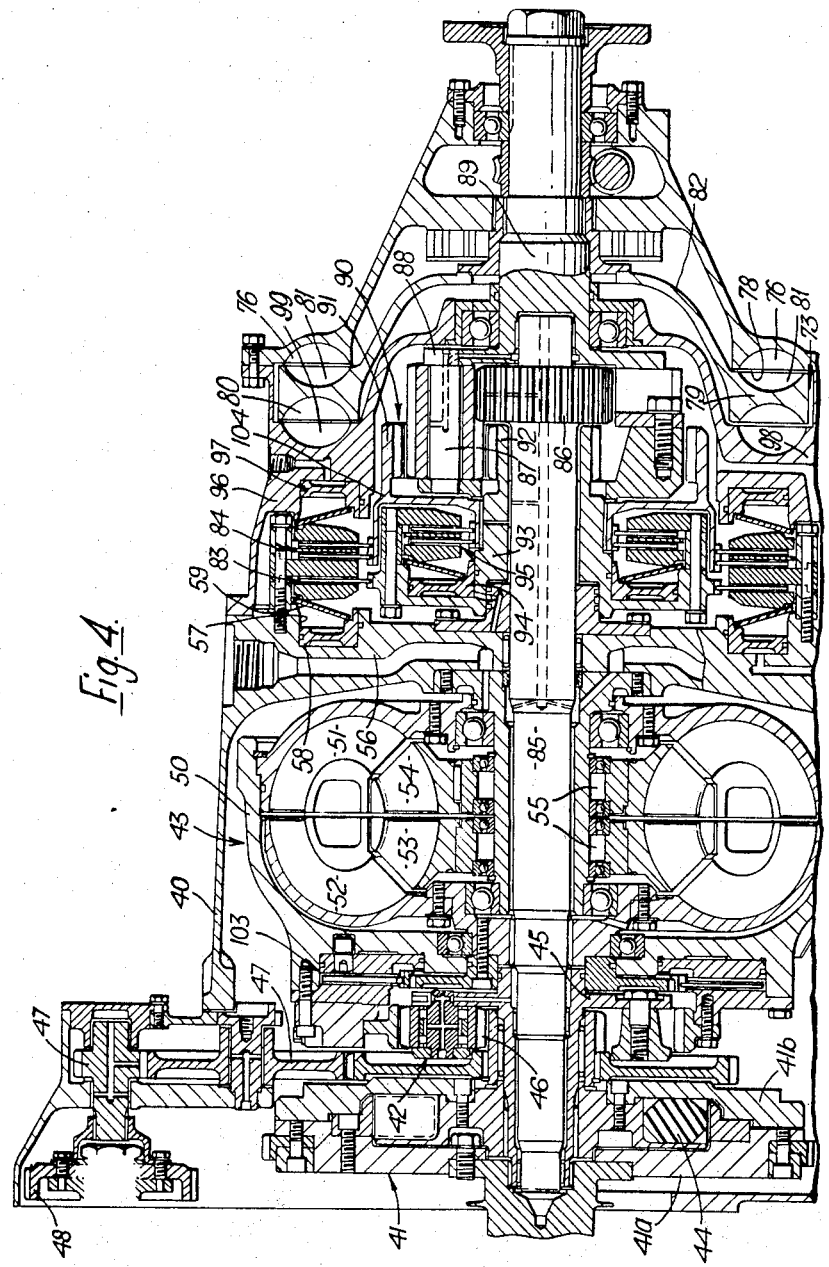

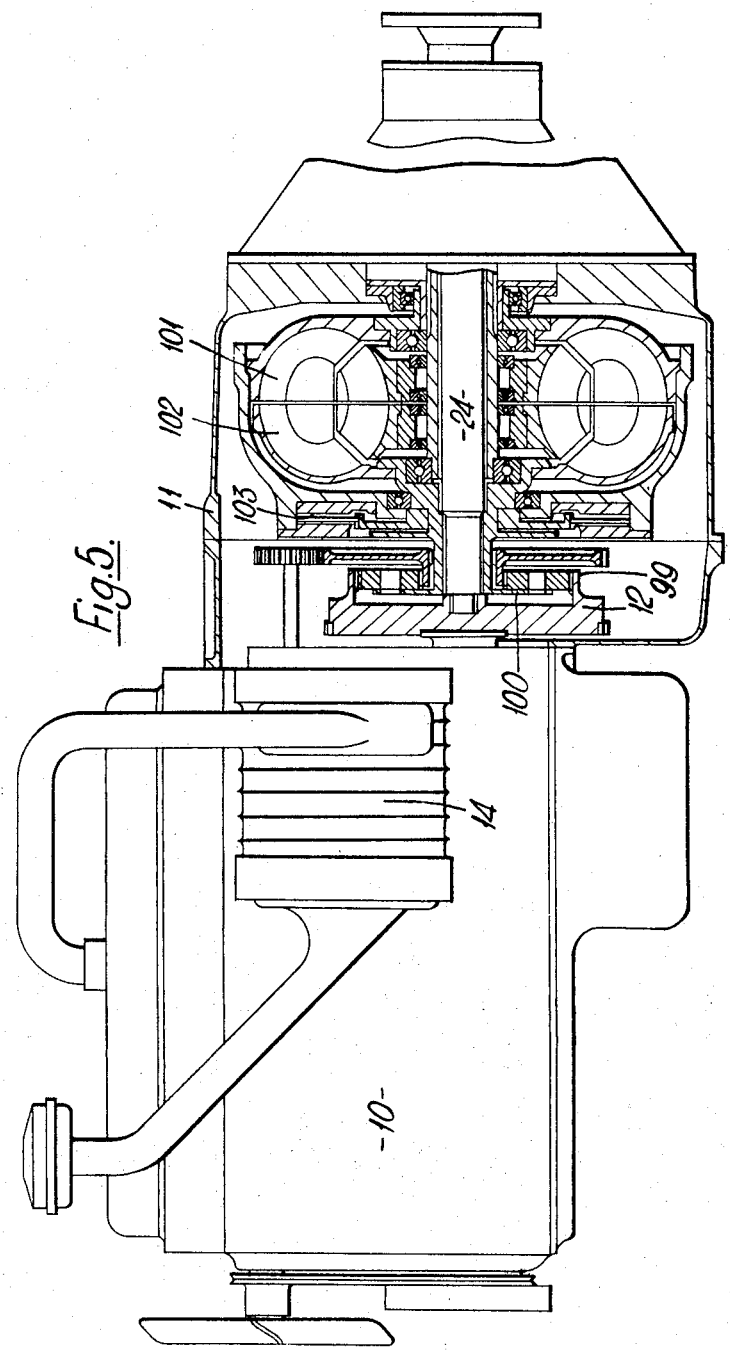

United States Patent Office 3,362,259
Patented Jan. 9, 1968

3,362,259
VEHICLE POWER PLANT
William J. Hayward, Stanground, England, assignor to Perkins Engines Limited, London, England
Filed Mar. 12, 1965, Ser. No. 439,217
Claims priority, application Great Britain, Mar. 20, 1964, 12,000/64
7 Claims. (Cl. 74—730)

ABSTRACT OF THE DISCLOSURE

A power plant including an internal combustion engine having its output shaft drivingly connected to one element of a three-element differential gear. A supercharging compressor is drivingly connected to a second element of the differential gear for supercharging the engine, and a hydraulic torque converter has its pump component drivingly connected to the third element of the differential gear. The differential gear and torque converter are enclosed within a first housing, and a second housing is detachably mounted on the first housing and encloses a gear train. Clutches in the second housing drivingly connects the motor component of the torque converter to the gear train. The housings and their components can be detached as units.

---

This invention relates to power plants and especially, but not exclusively, to ground vehicle power plants.

An object of this invention is to provide a compact power plant especially suitable for large trucks and similar vehicles in which the various components are readily accessible for servicing, and in which additional speed ratios can be alternately connected.

A further object is to provide a power plant including an engine, a three element differential gear, a hydraulic torque converter, a gear train providing variable speed ratios to the output shaft wherein the differential gear and torque converter are enclosed in a first housing, and the gear train is enclosed in a second housing, and wherein the first housing is readily detachable from the engine and the second housing is readily detachable from the first housing so that the components may be easily serviced.

Yet another object is to provide a compact unitary power plant capable of operating a supercharger and including a torque converter, variable speed transmission and brake in a single package, with the components being individually accessible for servicing.

A still further object is to provide an improved hydrodynamic brake for power plants that occupies a minimum amount of space.

Another object is to provide a flywheel having improved vibration damping means.

Other objects, advantages and features of the invention will become apparent from the following description taken in connection with the accompanying drawings in which:

FIG. 3 is a more detailed drawing of part of the power plants represented in FIGS. 1 and 2, in which two speed ratios and a transmission brake are provided;

FIG. 4 is a more detailed drawing of a part of the power plants represented in FIGS. 1 and 2 in which three speed ratios and a transmission brake are provided; and FIG. 5 is a drawing of an alternative form of differential unit.

Figure 1:
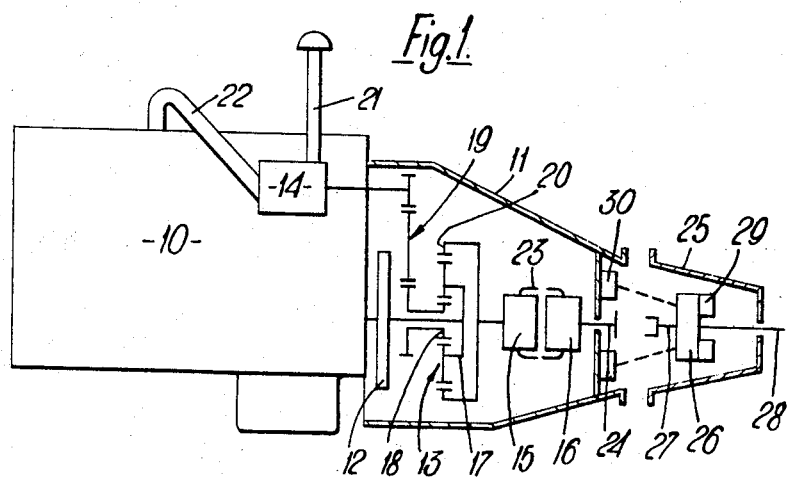
FIG. 1 is a diagrammatic representation of one form of a power plant according to the invention.

Referring to FIG. 1, a diesel engine 10 has secured to it a housing 11 which encloses a flywheel 12, a three element differential gear 13, a torque converter input or pump unit 15 and torque converter output or motor unit 16. The drive from the flyweel 12 is taken to the planet carrier 17 of the differential gear 13 and from there through the sun gear 18 and a further gear train 19 to a supercharging compressor 14 for the engine; the drive from the flywheel 12 is also taken to the pump unit 15 through the ring gear 20. Air is drawn into the compresser through pipe 21 and discharged into the engine through manifold 22. The dotted lines 23 indicate a hydraulic drive connection between the pump and motor units 15 and 16, respectively. An intermediate drive member 24 and all parts enclosed by housing 11 are supported thereby.

A second housing 25 encloses and supports a gear train 26, an input shaft 27 and an output shaft 28. The gear train is capable of providing one or more forward or reverse speed ratios, and a drive establishing and disestablishing means in the form of a clutch 29 is provided in the housing 25 for engaging one of the ratios. The housing 25, the input shaft 27 and gear train 26 are adapted to engage with the housing 11, the intermediate drive member 24 and a drive establishing and disestablishing means in the form of a clutch 30, respectively. The clutch 30 is carried by the housing 11 and is operable to engage a further ratio. The housings 11 and 12 are formed of approximately the same diameter at their engaging faces, and attachment means in the form of an externally accessible ring of bolts is provided to enable the housings to be readily detachable. The engagement means for engaging the motor component 16 through the drive member 24 to the gear train input shaft 27 is readily engageable and disengageable; thus, the housings 11 and 12 together with their enclosed parts are readily disengageable for servicing.

Figure 2:
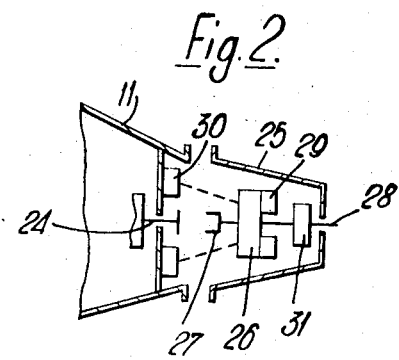
FIG. 2 is a diagrammatic representation of a part of a second form of power plant.

In FIG. 2 the housing 25 additionally encloses a transmission brake 31 which is secured to the output shaft 28.

Referring now to FIG. 3 which is a more detailed representation of one form of power plant without the engine being shown, the housing 40 encloses a two part flywheel 41, a planetary epicyclic differential gear 42 and a hydrodynamic torque converter 43. The flywheel 41 has two parts 41a and 41b drivingly connected by blocks of rubber 44 for the purpose of absorbing low speed vibrations from the engine. The part 41b is connected to the planet carrier 45 of the differential gear 42, the sun gear 46 is connected through a further gear train 47 to a flange 48 for connection to the compressor, and the ring gear 49 is connected through a shell member 50 to the driving member in the form of an impeller 51 of the torque converter 43. A driven member in the form of a turbine 52 is enclosed within the shell member 50 along with two stator members 53 and 54 which are mounted on freewheel devices 55.

The housing 40 has a wall 56 at its rear end in which is formed an annular cavity 57 in which an annular piston 58 is slideable in fluid tight relationship therewith. Movement of the piston 58 to the right under the influence of increased fluid pressure in the cavity 57 urges a dished Belleville spring 62 in a direction to engage a drive establishing and disestablishing means in the form of a multiple disc brake 60 also mounted on the wall 56.

A second housing 61 has a flange 59 for attachment through an annularly disposed series of externally accessible bolts to the housing 40 and encloses a gear train 63 which comprises a sun wheel 64 formed on an intermediate drive shaft 65 adapted to drivingly engage with the turbine 52, planet pinions 66 carried by a carrier 67 which is capable of being rendered stationary by the brake 60, and a ring gear 68 fixed to an output shaft 69. A drive establishing and disestablishing means in the form of a multiple disc clutch 70, when engaged by a piston and cylinder type fluid pressure actuating mechanism 71, acts to couple the intermediate shaft 65 directly to the output shaft 69.

The operation of the power plant is as follows. The drive from the engine is taken through the two part flywheel 41, where undesirable vibrations are damped out, to the differential 42 where the drive is split, part going to the compressor through the sun gear 46 and part to the converter impeller 51. The torque from the ring gear 49 is increased by the converter with turbine 52 driving shaft 65. If clutch 70 is engaged and disc brake 60 disengaged, the drive passes directly from the turbine to the output shaft 69. If both are disengaged, no transfer of power takes place; and if brake 60 only is engaged, the drive direction is reversed by virtue of the fact that the planet pinions 66 constitute idlers between the sun wheel 64 and the ring gear 68 which is connected to the output shaft 69.

It will be clear that if the housing 61 terminated along the dotted line 72 it would define the rearward end of a fully operative power plant capable of being installed in a vehicle for use in operating conditions which would not require a great deal of use of the brakes of the vehicle. In view of the fact that the present power plant does not have any so-called engine braking characteristics, it is desirable in certain operating conditions for vehicles equipped with the power plant described above to have some form of braking to aid the normal wheel brakes.

Accordingly, the power plant shown in FIG. 3 is optionally provided with a hydrodyamic brake 73 advantageously arranged to take up very little more space than the power plant without the brake. The housing 61 is thickened at 74 to provide room for an annular series of rearwardly presented cells 75. A similar series of forwardly presented cells 76 is formed on a supplementary housing 77 secured to housing 60. The two series of cells are spaced apart to form a cavity 78 in which a brake rotor 79 having two series of opposed cells 80 and 81 is arranged to rotate. The brake rotor 79 is fixed to the output shaft 69 and rotates therewith. Braking of the output shaft is achieved by feeding oil into the cavity 78, the amount of oil present in the cavity at any instant determining the braking force at that instant. Valves, not shown, are provided for controlling the amount of oil in the cavity. An example of suitable control mechanism is disclosed in copending U.S. application Ser. No. 331,451, filed Dec. 18, 1963.

An important feature of the hydrodynamic brake is that the opposed faces of said cells meet in a plane which is axially displaced from the portion of the shaft 69 on which the rotatable member is mounted, thus resulting in the bowl shape of the rotor disc 82. This bowl shape enables space to be saved by the consequent positioning of the rotor close to the brake 60 to preserve the general contour of the transmission, thus making the housing 77 light and economical to make and easier to fit in a vehicle than if the disc 82 extended radially from the hub to the cells 80 and 81.

Turning now to FIG. 4 it will be seen that the flywheel, differential gear, torque converter and the housing 40 are all identical with those shown in FIG. 3 and are given the same reference numerals. The brake actuating mechanism comprising the cavity 57 and the piston 58 is also the same. Two sets of multiple disc brakes 83 and 84 are, however, carried by the wall 56 of the housing 40, the piston 58 being operable through a dished Belleville spring 59 to engage brake 83.

An intermediate drive shaft 85 engages with the turbine support member, a sun gear 86 being formed on the same that engages a plurality of long planet gears 87 carried by a flange or carrier 88 of the output shaft 89. The planet gear wheels 87 form part of a compound epicyclic gear train, the forward portions of the gears 87 meshing with a second set of short planet gears 90. The second set of planet gears 90 mesh both with a ring gear 91 and a secondary sun gear 92.

The secondary sun wheel 92 is integral with a clutch support member 93 which carries a hydraulic clutch actuating piston 94 for a clutch 95. The clutch support member 93 is also connected to plates of brake 83.

A spider member 104 supports ring gear 91 on one arm, plates of disc brake 84 on another arm and plates of clutch 95 on a third arm. A housing 96 encloses the epicyclic gear train, brakes and clutch and carries the actuating mechanism 97 for clutch 84.

Brake 83 establishes a low ratio, clutch 95 establishes a higher forward drive ratio and brake 84 establishes a reverse ratio; only one friction member being engaged at a time. With brake 83 engaged, the secondary sun gear 92 is held stationary and secondary planets 90 and the planets 87 are caused to orbit. Planets 90 are larger in diameter than planets 87 so that shaft 89 is caused to turn in the same direction as shaft 85 but at a lower speed. When clutch 95 is engaged, the secondary sun 92 and the ring 91 are locked together so that no relative movement occurs between any of the gears of the train and shaft 89 rotates at the same speed and in the same direction as shaft 85.

When brake 84 is engaged, the ring 91 is held stationary and the secondary sun 92 meshing therewith and with the planet 87 causes the shaft 89 to rotate in the opposite direction to shaft 85 and at a lower speed than the latter. When all three friction elements are disengaged, the transmission is in neutral.

As in the embodiment shown in FIG. 3, the housing 96 can be thickened at 98 to provide cells 99 for the hydraulic brake 73. The secondary housing 77 with the brake 73 can be simply attached to the housing 96 as it can be to the housing 61 (FIG. 3).

In FIG. 5 there is shown the engine 10, compressor 14, and transmission housing 11 of FIG. 1, but this embodiment differs from the embodiment described with reference to the preceding figures in that the flywheel 12 is directly connected to the ring gear 99 of the differential gear instead of to the planet carrier 17 (FIG. 1) as before. The planet carrier 100 (FIG. 5) is connected directly to the torque converter impeller 101 and the turbine 102 is drivingly engageable with the intermediate shaft 24 (FIG. 1) as before. By rearranging the drive in this manner, the torque available for driving the impeller 101 is greater than if the impeller were driven by the ring gear and accordingly, the power plant is immediately rendered more suitable for installation in a vehicle demanding a high torque requirement, such as an earth-moving vehicle.

In FIGS. 3, 4 and 5 there is shown a hydraulically operated lock-up clutch 103 for clutching together the turbine and the impeller of the torque converter. This permits the hydraulic power path of the torque converter with its slightly adverse efficiency to be by-passed while the vehicle is operating at speeds above which torque converter operation is desirable.

As a result of the invention, a compact power plant is provided; additionally the various components may be readily detached for servicing; further it is possible to standardize the housings 40 and 77, and use alternative housings 61 and 96 depending on whether one or more forward speed ratios are required.

Additionally, it should be noted that the novel flywheel construction increases the ability of the flywheel to absorb vibrational forces and reduces the amplitude of such vibrations which may be passed on to other more fragile components of the power plant.

I claim:
1. A power plant including a three element differential gear, an internal combustion engine having its output shaft drivingly connected to one element of said differential gear, a supercharging compressor drivingly connected to a second element of said differential gear and operable when driven to supercharge said engine, a hydraulic torque converter including driving and driven components, the driving component being drivingly connected to the third element of the differential gear, a first housing enclosing said differential gear and said torque converter, a gear train for providing at least one forward speed ratio and at least one reverse speed ratio, an output member for said gear train, releasable means for establishing and disestablishing said forward and reverse speed ratios in said gear train, a first actuating mechanism on said first housing for actuating one of said releasable means, a second housing enclosing said gear train and said releasable means, at least one additional actuating mechanism in said second housing for actuating the other releasable means, readily engageable and disengageable engagement means for drivingly connecting said torque converter driven component to said gear train, and attachment means attaching said second housing to said first housing and permitting said second housing to be readily detached from said first housing.

2. A power plant according to claim 1 in which the differential gear includes a ring gear and plant carrier, and in which the ring gear is connected to the output shaft of the engine and the plant carrier is connected to the driving component of the torque converter.

3. A power plant according to claim 1 in which said actuating mechanisms are hydraulically operated.

4. A power plant according to claim 3 in which the hydraulically actuable releasable means are arranged so that at least one of said releasable means is positioned radially inwardly of another with respect to the gear train output member.

5. A power plant according to claim 1 in which said gear train provides two forward speed ratios and one reverse speed ratio and includes three of said releasable means for engaging said ratios, said second housing including a three-limbed spider member, one limb supporting the ring gear of the epicyclic gear train, a second limb supporting a first of said releasable means and a third limb supporting a second of said releasable means.

6. A power plant according to claim 1 further including a hydrodynamic brake enclosed within a third housing, and including engagement means drivingly connected between the rotor of said hydrodynamic brake and the gear train output member, said gear train and attachment means attaching said third housing to said second housing and permitting said third housing to be readily detached from said second housing.

7. A power plant according to claim 1 wherein said first actuating mechanism comprises an annular cavity in the external wall of said first housing connected with a source of fluid pressure, and an annular piston slideable therein in fluid tight relationship therewith.

References Cited

UNITED STATES PATENTS

| | | | |
|---|---|---|---|
| 1,078,565 | 11/1913 | Tuttle | 74—792 |
| 1,392,985 | 11/1921 | Tuttle | 74—792 |
| 1,867,427 | 7/1932 | Ulrich | 74—792 |
| 2,564,466 | 8/1951 | Clifton | 74—732 |
| 2,568,135 | 9/1951 | Vincent | 74—732 X |
| 2,625,057 | 1/1953 | Kelbel | 74—761 |
| 2,682,177 | 6/1954 | Kelbel | 74—732 X |
| 2,769,303 | 11/1956 | Lucia et al. | 74—688 X |
| 2,827,989 | 3/1958 | Christenson | 788—90 X |
| 2,860,526 | 11/1958 | Dodge | 74—732 X |
| 2,864,473 | 12/1958 | Christenson et al. | 192—4 |
| 2,971,385 | 2/1961 | Miller | 74—761 |
| 3,040,589 | 6/1962 | Chapman | 74—15.84 |
| 3,072,222 | 1/1963 | Kugel et al. | 188—90 |
| 3,077,730 | 2/1963 | Glamann | 74—677 |
| 3,146,863 | 9/1964 | Herbenar et al. | 60—12 X |
| 3,233,478 | 2/1966 | General et al. | 74—761 |
| 3,238,713 | 3/1966 | Wallace | 60—13 |

FOREIGN PATENTS

| | | |
|---|---|---|
| 1,264,983 | 5/1961 | France. |
| 1,352,025 | 12/1963 | France. |

ROBERT A. O'LEARY, *Primary Examiner.*

DAVID. J. WILLIAMOWSKY, *Examiner.*

J. R. BENEFIEL, *Assistant Examiner.*